United States Patent Office
3,503,768
Patented Mar. 31, 1970

3,503,768
DIALDEHYDE STARCH HYDRAULIC CEMENT
COMPOSITION ADDITIVE
Robert W. Previte, Lawrence, Mass., assignor to W. R. Grace & Co., Cambridge, Mass., a corporation of Connecticut
No Drawing. Filed Mar. 22, 1967, Ser. No. 632,490
Int. Cl. C04b 13/24, 7/00
U.S. Cl. 106—92                        5 Claims

ABSTRACT OF THE DISCLOSURE

The setting time of cement compositions is retarded by the addition of the product of periodic acid oxidation of starch.

This invention is directed to additives for cement compositions, and more particularly, to set retarding additives for concrete, mortar and neat paste.

In the construction of cementitious structures, it is often desirable to delay the set in order to permit proper placement and working of the concrete. For example, in preparing large structures of concrete, it would be undesirable to have the portion of the concrete poured first set before all of the concrete has been poured. In addition, if construction takes place during the hot weather, the setting of the concrete is accelerated to the point where it is difficult to work the concrete properly before it is set. In order to avoid the aforementioned difficulties, materials known as set retarders are added to concrete mixes to delay the set. Such set retarders, however, suffer from various deficiencies, such as decreasing the compressive strength of the concrete and undesirable high degree of air entrainment. Many prior art set retarders are effective in only a narrow range (ineffective at relatively low addition rates but cause flash set at relatively high addition rates). Some conventional set retarding compositions function only for specific types of cements.

A composition has now been found which when added to concrete compositions will efficiently retard the initial set of the concrete without any of the aforementioned deficiencies.

For ease, the retarding admixture of the present invention is defined primarily in terms of addition to concrete but it should be understood that it works equally as well with mortar and neat paste. Although the exact chemical reaction is not known for certain it is believed that the set retarder acts in the cement alone and is independent of the particular aggregate employed.

The novel composition of the present invention comprises cement and the product of the periodic acid oxidation of starch. This material is also referred to as an anionic polymeric dialdehyde derived by periodate oxidation of starch. For convenience, the aforementioned oxidation product will be referred to herein as "dialdehyde starch," the term conventionally employed in the literature.

The periodate oxidation of starch is very specific, cleaving the bond between carbon atoms 2 and 3 of the anhydroglucose unit to form two aldehyde groups. The following represents the aforementioned bond cleavage:

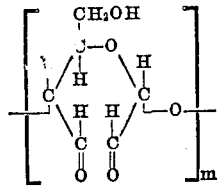

Although other oxidants for starch are known in the art, they do not produce the dialdehyde product achieved by the above described periodic acid oxidation of starch.

Dialdehyde starch is known to the art (see for example J. Amer. Chem. Soc. 59: 2049 (1937)) and is commercially available.

The set retarder of the present invention is preferably employed at a level of about .02 to 0.15% by weight based on the weight of the dry cement. In a preferred embodiment, the set retarder is employed at 0.04 to 0.06%, more preferably 0.05%. Since the setting of concrete is influenced to a great extent by temperature, it is to be understood that the addition level of the set retarder may vary from the above-mentioned addition rates according to the temperature under which the concrete is employed and the desired degree of set retardation. Thus at temperatures in excess of room temperature greater amounts than that set forth above may be necessary to provide the equivalent set retardation. The set retarders of the present invention are solids and are added to concrete mixes in this form or alternatively as liquids in solution or as dispersions.

The cements represented in the examples below contain 5½ sacks (517 lbs.) of cement per cubic yard. The compositions were tested for time of setting in accordance with ASTM C403–65T. Compressive strength measurements were carried out in accordance with ASTM C192–62T. The amount of the various admixtures will be expressed as a percentage of the dry cement.

The admixture of the present invention was added in solution with the water to the cement. For comparative purposes, conventional set retarders were also employed.

The dialdehyde starch employed in the following examples had the following typical properties:

Percent aldehyde content (number of original anhydroglucose units now in the dialdehyde form per 100 units in the chain)—80%
Moisture—Less than 10%
Sulfated ash—4%
Bulk density—25–27 lbs./cu. ft.

TABLE 1.—TYPE I PORTLAND CEMENT

| Additive | Amount added, percent | Initial set (hrs.: min.) | Final set (hrs.: min.) |
|---|---|---|---|
| Blank | | 5:00 | 6:40 |
| Dialdehyde starch | 0.05 | 7:00 | 8:40 |
| Sodium hypochlorite oxidized starch | 0.05 | 5:30 | 7:00 |
| Lignosulfonate set retarder | 0.237 | 6:10 | 8:00 |

TABLE 2.—TYPE III PORTLAND CEMENT

| Additive | Amount added, percent | Initial set (hrs.: min.) | Final set (hrs.: min.) |
|---|---|---|---|
| Blank | | 6:00 | 8:00 |
| Dialdehyde starch | 0.075 | 7:30 | 9:35 |
| Sodium hypochlorite oxidized starch | 0.075 | 6:20 | 8:15 |
| Lignosulfonate set retarder | 0.237 | 5:05 | 7:10 |
| Sodium gluconate | 0.075 | 6:20 | 8:15 |

From the above it will be noted that the set retarder of the present invention provides greater setting efficiency than commercial set retarders as well as other oxidized starches, and at a lower addition level.

TABLE 3.—TYPE I PORTLAND CEMENT

| Percent dialdehyde starch | Initial set (hours:mins.) | Final set (hours:mins.) |
|---|---|---|
| 0 (blank) | 5:00 | 6:40 |
| .025 | 5:40 | 7:25 |
| .050 | 8:30 | 10:15 |
| 0.100 | 11:00 | 14:25 |
| 0.150 | 20:30 | |

From the above it will be noted that the additive is effective over a relatively wide range.

In the following setting tests, ASTM C403–65T was used except that the tests were carried out on mortar instead of concrete. The mortar employed was composed of 2000 g. of cement, 2000 g. of fine sand, 2500 g. of medium sand and 900 g. of water.

TABLE 4.—TYPE I PORTLAND CEMENT

| Additive | Amount added, percent | Initial set, hrs. | Retardation, hrs. |
|---|---|---|---|
| Blank | | 3.4 | |
| Dialdehyde starch | 0.046 | 5.3 | 1.9 |
| Sodium hypochlorite oxidized starch | 0.050 | 3.7 | 0.3 |
| Dialdehyde starch | 0.09 | 9.7 | 6.3 |
| Sodium hypochlorite oxidized starch | 0.10 | 3.8 | 0.4 |

TABLE 5.—TYPE I PORTLAND CEMENT

| Additive | Amount added, percent | Initial set, hrs. | Retardation, hrs. |
|---|---|---|---|
| Blank | | 2.9 | |
| Dialdehyde starch | 0.018 | 3.4 | 0.5 |
| Do | 0.046 | 4.6 | 1.7 |
| Do | 0.064 | 6.3 | 3.4 |
| Do | 0.091 | 8.6 | 5.7 |
| Lignosulfonate set retarder | 0.100 | 3.9 | 1.0 |

While the preferred aldehyde content of the additive is 80% it should be understood that materials having other aldehyde contents are also employed satisfactorily in the present invention. In the following table the set retardation of mortar was determined employing dialdehyde starches having various aldehyde contents. ASTM C403–65T was employed except that the tests were carried out on mortar instead of cements. The mortar employed was composed of 2000 g. of Type I cement, 2000 g. of fine sand, 2500 g. of medium sand and 900 g. of water. All additives were employed at a level of 0.05% by weight based on the weight of cement.

TABLE 6

| Additive | Initial set, hrs. | Retardation, hrs. |
|---|---|---|
| Blank | 4.2 | |
| Dialdehyde starch (9.3% aldehyde content) | 4.6 | 0.4 |
| Dialdehyde starch (56% aldehyde content) | 5.1 | 0.9 |
| Dialdehyde starch (95% aldehyde content) | 5.4 | 1.2 |

As mentioned above, the set retarder of the present invention functions equally as well with all types of cement. It is effective at relatively low addition rates and does not cause flash set at relatively high addition rates. In addition, the set retarder does not result in an increase in air entrainment; however, it does increase compressive strength of the cement composition in which it is employed.

The set retarder of the present invention is employed alone in the concrete or is mixed with other cement additives prior to introduction into the concrete.

Since changes may be made in the above products without departing from the scope of the invention, it is intended that all matter contained in the above description shall be interpreted as illustrative and not in a limiting sense.

What is claimed is:
1. A composition comprising a portland cement and about 0.02 to 0.15 percent by weight, based on the weight of said cement, of a dialdehyde starch.
2. A composition as defined in claim 1 wherein said dialdehyde starch has an aldehyde content of 95%.
3. A hydraulic cement mix comprising a portland cement, an amount of water sufficient to cause said cement to set, and, a dialdehyde starch, the amount of said dialdehyde starch present being sufficient to retard the setting time of said mix.
4. A product as defined in claim 3 wherein said dialdehyde starch has an aldehyde content of 95%.
5. A product as defined in claim 3 wherein said dialdehyde starch is employed at a level of about 0.02 to 0.15 percent by weight based on the weight of the dry cement.

References Cited

UNITED STATES PATENTS

| | | | |
|---|---|---|---|
| 3,414,420 | 12/1968 | Maravilla et al. | 106—92 |
| 2,576,955 | 12/1951 | Ludwig | 260—29.6 |
| 2,489,793 | 11/1949 | Ludwig | 106—92 |
| 2,470,505 | 5/1949 | Ludwig | 106—92 |
| 2,429,211 | 10/1947 | Andres et al. | 106—92 |
| 2,024,123 | 12/1935 | Baker | 106—80 |

TOBIAS E. LEVOW, Primary Examiner

W. T. SCOTT, Assistant Examiner

U.S. Cl. X.R.

106—90, 315